Figure 4:
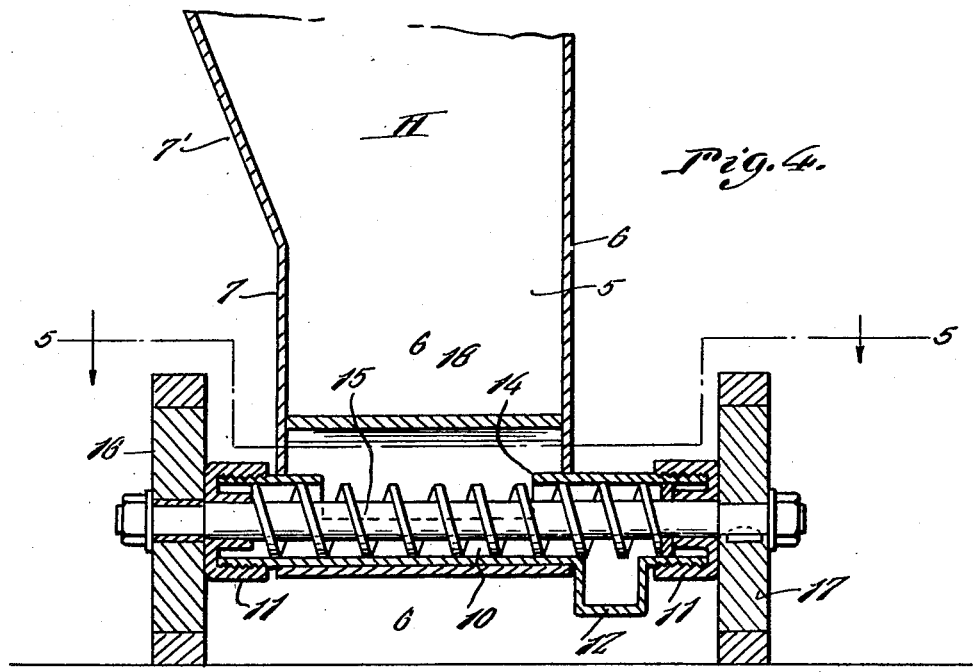

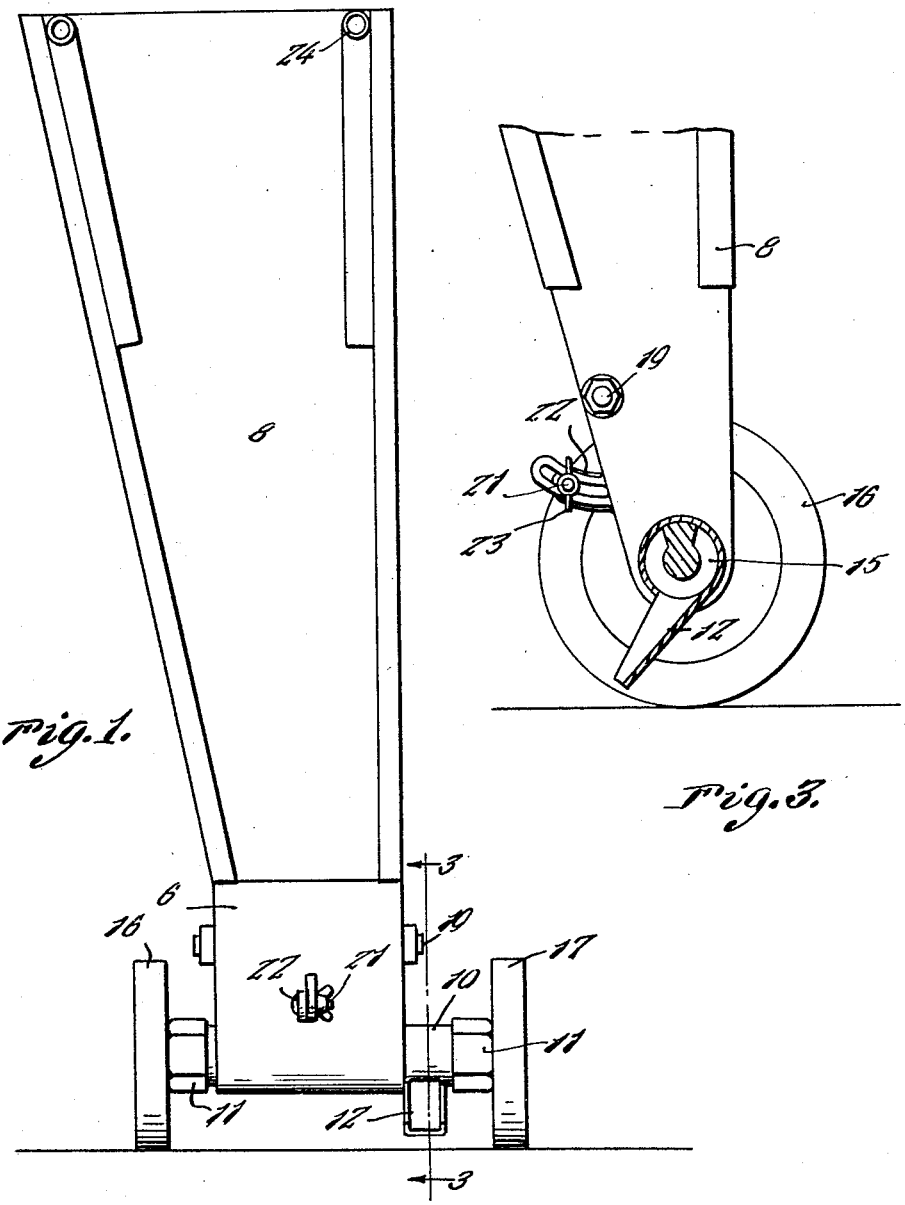

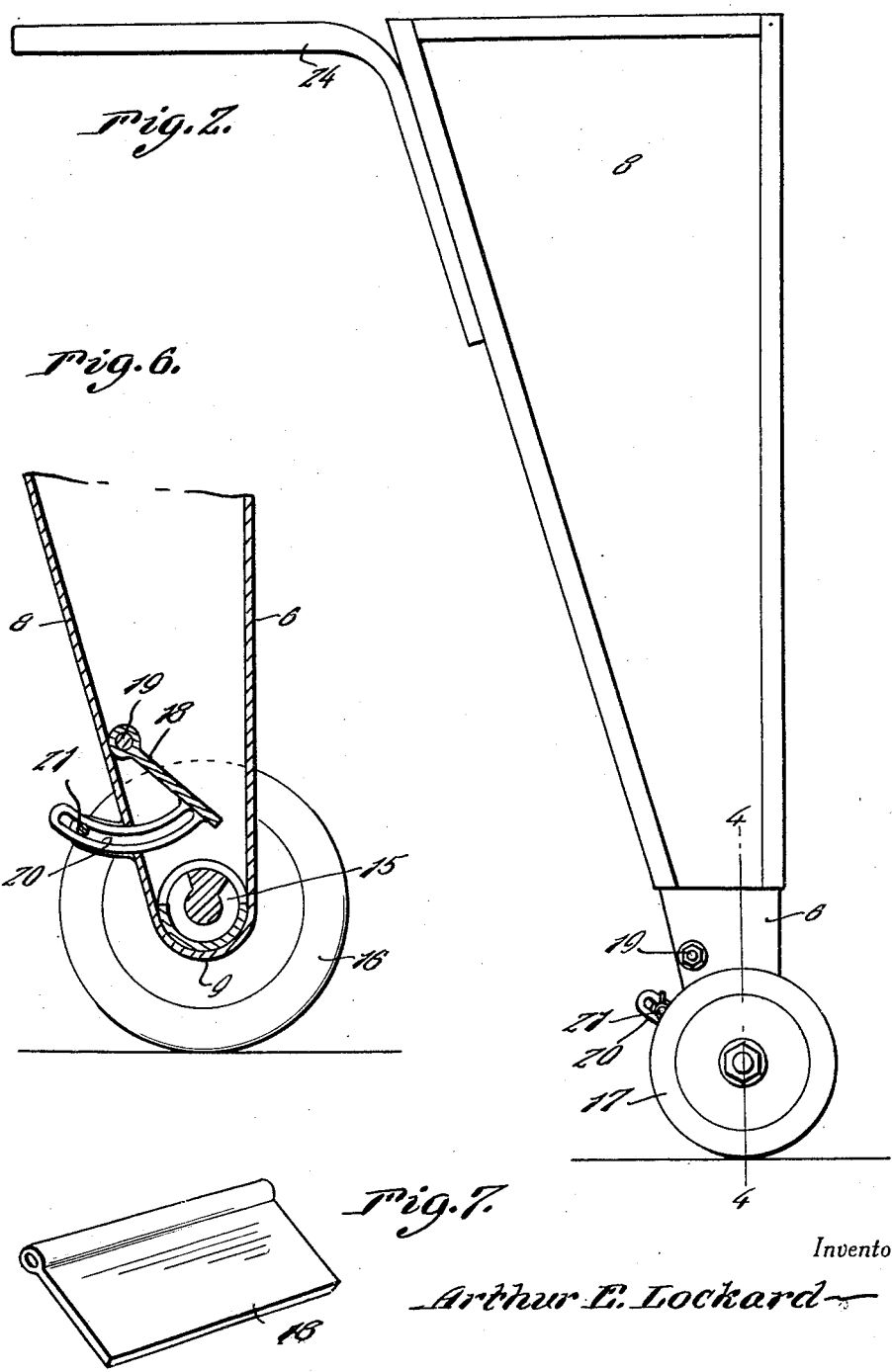

Patented June 23, 1931

1,811,324

UNITED STATES PATENT OFFICE

ARTHUR E. LOCKARD, OF GRAFTON, WEST VIRGINIA

STONE SPREADER

Application filed February 8, 1930. Serial No. 426,895.

The present invention relates to a stone spreader and has for its prime object the provision of an apparatus for spreading covering material such as sand, limestone, etc., upon cracks in pavements which have been filled with tar.

Another very important object of the invention resides in the provision of a mobile stone spreader of this nature mounted on two wheels one of which operates a screw conveyor so that the apparatus may be tilted to one side to ride only on the other wheel when it is not desired to use the screw conveyor.

A still further very important object of the invention resides in the provision of a stone spreading apparatus of this nature which is exceedingly simple in its construction, inexpensive to manufacture, strong and durable, thoroughly efficient and reliable in use and operation, and in the combination and arrangement of parts as will be hereinafter more fully described and claimed.

Figure 5:
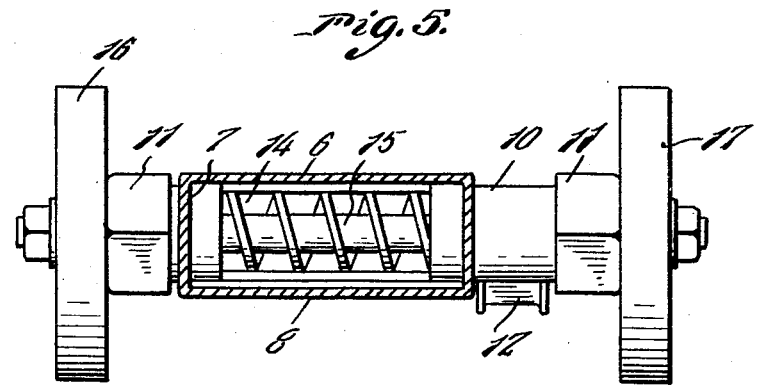

In the drawings:

Figure 1 is a rear elevation of the apparatus embodying the features of my invention, Figure 2 is a side elevation thereof, Figure 3 is a detail sectional view taken substantially on the line 3—3 of Figure 1, Figure 4 is a vertical sectional view taken substantially on the line 4—4 of Figure 2, Figure 5 is a horizontal section taken substantially on the line 5—5 of Figure 4, Figure 6 is a sectional view taken substantially on the line 6—6 of Figure 4, and Figure 7 is a perspective view of the gate valve.

Referring to the drawings in detail it will be seen that the letter H denotes generally a hopper which tapers downwardly and comprises a vertical front wall 5, a right hand side wall 6, a left hand side wall 7, the upper portion of which is denoted specifically by numeral 7′ and tapers upwardly and outwardly from the side wall 6, and a rear wall 8 inclines upwardly and outwardly from the front wall 6.

Curved bottom 9 is provided at the lower ends of the walls 5, 6, 7 and 8. A cylindrical trough 10 is mounted on the bottom 9 and extends through openings in the side walls 6 and 7. Bearings 11 are threadedly engaged with the ends of the cylindrical trough. A spout 12 is formed at the right hand end portion of the trough and inclines downwardly and rearwardly.

The cylindrical trough is formed with an opening 14 in the top thereof within the hopper. A screw conveyor 15 is mounted for rotation in the trough having its shaft portion journaled in the bearings 11 and extending outwardly therefrom. On the left hand end of said shaft portion there is journaled a wheel 16 while on the right hand end thereof there is keyed a wheel 17.

A gate valve 18 is hingedly mounted as at 19 in the hopper on the rear wall 8 above the trough 10 and is controlled by an arcuate slotted arm 20 through which extends a bolt 21 on an ear 22 projecting rearwardly from the rear wall 8 so that the nut 23 may be tightened on the bolt to hold the gate valve in any desired position.

Handles 24 are mounted on the rear wall 8 of the hopper H at the upper end thereof and extend rearwardly. The sand, limestone or the like is placed in the hopper and the valve 18 is set as desired. The inclined side wall 7′ allows the apparatus to be tilted to the left easily so as to roll only on the wheel 16 when it is not desired to feed the material on to the pavement.

When it is desired to feed the material on the tarred crack the apparatus is maneuvered until the spout 12 moves over said crack and then the apparatus is righted so as to roll on both wheels 16 and 17. The rotation of the wheels 17 causes the drawing of the material from the bottom of the hopper through the spout allowing the same to gravitate downwardly through the spout 12 on the crack.

It is thought that the construction, operation, utility and advantages of this invention will now be quite apparent to those skilled in this art without a more detailed description thereof.

The present embodiment of the invention has been disclosed in considerable detail merely for the purposes of exemplification since in actual practice it attains the features of advantage enumerated as desirable in the statement of the invention and the above description.

It will be apparent that changes in the details of construction, and in the combination and arrangement of parts may be resorted to without departing from the spirit or scope of the invention as hereinafter claimed or sacrificing any of its advantages.

Having thus described my invention, what I claim as new is:

1. In an apparatus of the class described, a hopper, a trough in the bottom of the hopper, a screw conveyor journaled in the trough, a wheel journaled on one end of the conveyor, a wheel keyed to the other end of the conveyor, and a spout provided at one end portion of the trough, a gate valve hingedly mounted in the hopper above the trough, and means for swinging and holding the gate valve in adjusted position, said hopper including a side wall adjacent said one wheel which is inclined upwardly and outwardly from the other side wall to enable the apparatus to be easily tilted.

2. In an apparatus of the class described, a hopper, a trough in the bottom of the hopper, a screw conveyor journaled in the trough, a wheel journaled on one end of the conveyor, a wheel keyed to the other end of the conveyor, and a spout provided at one end portion of the trough, a gate valve hingedly mounted in the hopper above the trough, and means for swinging and holding the gate valve in adjusted position, said hopper including a side wall adjacent said one wheel which is inclined upwardly and outwardly from the other side wall to enable the apparatus to be easily tilted, the rear wall of the hopper inclining upwardly and rearwardly from the front wall, and handles affixed to the rear wall and extending rearwardly.

3. In an apparatus of the class described, a hopper, a cylindrical trough across the bottom of the hopper extending to the sides thereof, bearings threadedly engaged on the ends of the trough, a screw conveyor mounted in the trough and including a shaft portion journalled through the bearings and extending outwardly therefrom, a wheel journalled on one of the ends of the shaft portion and a wheel keyed to the other end of the shaft portion, a spout extending from the trough adjacent the wheel keyed to the shaft portion of the conveyor, said hopper including a side wall adjacent the wheel journaled on the shaft portion of the conveyor, said side wall last mentioned inclining upwardly and away from the opposite side wall of the hopper.

In testimony whereof I affix my signature.

ARTHUR E. LOCKARD.